(12) United States Patent
Arakawa et al.

(10) Patent No.: US 6,987,354 B2
(45) Date of Patent: Jan. 17, 2006

(54) TRANSPARENT CONDUCTIVE FILM

(75) Inventors: Fumihiro Arakawa, Tokyo-To (JP); Taiji Suga, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 278 days.

(21) Appl. No.: 10/200,549

(22) Filed: Jul. 23, 2002

(65) Prior Publication Data

US 2003/0071794 A1 Apr. 17, 2003

(30) Foreign Application Priority Data

Jul. 26, 2001 (JP) .............................. 2001-226047

(51) Int. Cl.
 *H01J 1/62* (2006.01)
(52) U.S. Cl. ..................... 313/506; 313/512; 428/917
(58) Field of Classification Search ........ 313/498–512; 428/690, 917, 457, 339
See application file for complete search history.

(56) References Cited

U.S. PATENT DOCUMENTS 5,776,373 A * 7/1998 Bergmann et al. ....... 252/518.1
5,964,962 A * 10/1999 Sannomiya et al. ......... 136/256
6,603,085 B2 * 8/2003 Oya et al. .................... 200/512
6,689,458 B1 * 2/2004 Mikoshiba et al. .......... 428/339
2002/0167270 A1 * 11/2002 Siwinski et al. ............. 313/506

FOREIGN PATENT DOCUMENTS

JP 05338086 A * 12/1993
JP 10323931 A * 12/1998

* cited by examiner

*Primary Examiner*—Karabi Guharay
*Assistant Examiner*—German Colón
(74) *Attorney, Agent, or Firm*—Oliff & Berridge, PLC

(57) ABSTRACT

A transparent conductive film 1 comprises a transparent plastic film 2 and a transparent conductive layer 4 laminated to at least one surface of the transparent plastic film 2. The transparent conductive film 1, as a whole, has a haze value of 8 or less; and at least one of the two surfaces of the transparent plastic film 2, that is, the surface to which the transparent conductive film 4 is laminated and the other surface, is provided with fine irregularities having a maximum height (Rmax) of 0.5 to 2.0 $\mu$m. These fine irregularities preferably have a ten-point mean roughness (Rz) of 0.35 to 1.5 $\mu$m. The fine irregularities maybe provided as the surface structure of a fine irregularity layer 3 laminated to one surface of the transparent plastic film 2. The transparent conductive layer 4 may be laminated to the surface of the fine irregularity layer 3 formed on the transparent plastic film 2, or to the surface of the transparent plastic film 2 to which the fine irregularity layer 3 is not laminated.

10 Claims, 5 Drawing Sheets

TRANSPARENT CONDUCTIVE FILM

BACKGROUND OF THE INVENTION

1. Field of the Invention

The present invention relates to a transparent conductive film capable of showing excellent display quality when used for a display or the like and good handling properties in the course of manufacturing, processing or the like. The present invention also relates to a touch panel and an electroluminescent display panel that use such a transparent conductive film. Furthermore, the present invention relates to a process of producing the transparent conductive film.

2. Description of Related Art

Transparent conductive films function as electrodes, and, in addition, have transparency, so that it is possible to see objects through these films. They are, therefore, often used as electrode sheets for display panels of various modes or touch panels to be placed on the surfaces of displays.

For example, such a transparent conductive film is obtained by laminating a transparent conductive layer of ITO (indium tin oxide), ATO (antimony-doped indium tin oxide) or the like to the surface of a transparent plastic film such as a polyethylene terephthalate resin film.

In the case where the above-described transparent conductive film is used for a display panel or touch panel, it has sometimes been subjected to anti-glaring treatment, in which a mat paint is applied to the transparent conductive film for the purpose of decreasing reflection of extraneous light. If a mat paint is applied to the transparent conductive film, the effect of preventing glaring can be obtained, but the following problems newly occur: an image on the display visible through the transparent conductive film appears fuzzy; the moiré pattern appears at boundaries between pixels on the display; and the central part of the display is strikingly seen due to its brightness higher than that of the other part.

Attaching great importance to transparency, on the other hand, there has also been adopted, to improve display visibility, such a means that the surface of the transparent conductive film is smoothed to a mirror surface to eliminate the scattering of light. However, a transparent conductive film having a mirror surface is extremely poor in surface slipperiness. Therefore, when such a transparent conductive film is processed by a roll-to-roll method (a method comprising: unwinding a continuous substrate such as a transparent plastic film; forming a transparent conductive layer on the substrate under vacuum by deposition, sputtering or the like; and winding, around a roll, the transparent conductive film obtained), such a phenomenon (blocking) tends to occur that one surface of the substrate sticks to the other surface of the substrate or that the substrate cannot smoothly run in the production unit. If blocking occurs, the transparent conductive film obtained cannot be rolled into a good shape, and the unrolled transparent conductive film has traces of blocking on its surface.

To prevent occurrence of blocking, it seems effective to employ such a technique that a blocking-preventing tape is adhered to or irregularities called knurls are provided on both sides of the transparent plastic film. To employ this technique, however, it is necessary to modify those sections of the production unit that correspond to a series of the steps of forming a transparent conductive layer by vacuum deposition or sputtering on an unwound substrate film, and winding the transparent conductive film obtained. In addition, after these steps, it is necessary to remove the tape adhered to both sides of the substrate film, or to remove both sides of the substrate film, on which the irregularities are provided, by a slitter or the like.

SUMMARY OF THE INVENTION

The present invention was accomplished in the light of the aforementioned drawbacks in the related art. An object of the present invention is to provide a transparent conductive film capable of showing excellent display quality when used for a display or the like and good handling properties in the manufacturing process or the like; a touch panel and an electroluminescent display panel that use such a transparent conductive film; and a process of producing the transparent conductive film.

A first aspect of the present invention is a transparent conductive film comprising: a transparent plastic film; and a transparent conductive layer laminated to one surface of the transparent plastic film; wherein the transparent conductive film, as a whole, has a haze value of 8 or less; and at least one of the two surfaces of the transparent plastic film, that is, the surface to which the transparent conductive layer is laminated and the other surface, is provided with fine irregularities having a maximum height (Rmax) of 0.5 to 2.0 $\mu$m.

In the first aspect of the present invention, it is preferable that the fine irregularities have a ten-point mean roughness (Rz) of 0.35 to 1.5 $\mu$m.

Further, in the above-described first aspect, the fine irregularities may be provided as the surface structure of the transparent plastic film or that of a transparent resin layer laminated to the surface of the transparent plastic film.

Furthermore, in the first aspect described above, it is preferable that the transparent conductive film further comprises a hard coat layer laminated to the surface of the transparent plastic film opposite to the surface to which the transparent conductive layer is laminated. In this case, it is preferable that the fine irregularities be provided on the surface of the transparent plastic film to which the transparent conductive layer is laminated; and that the other surface of the transparent plastic film to which the hard coat layer is laminated be made smooth so that the exposed surface of the hard coat layer can be a mirror surface.

A second aspect of the present invention is a touch panel comprising: a first sheet having an electrode layer; and a second sheet having an electrode layer, arranged on the first sheet with a spacer interposed between the first and second sheets so that the two electrode layers can face each other with an extremely small gap between them; wherein at least one of the first and second sheets is a transparent conductive film that comprises a transparent plastic film and a transparent conductive layer serving as the electrode layer, laminated to one surface of the transparent plastic film, the transparent conductive film, as a whole, having a haze value of 8 or less, at least one of the two surfaces of the transparent plastic film, that is, the surface to which the transparent conductive layer is laminated and the other surface, being provided with fine irregularities having a maximum height (Rmax) of 0.5 to 2.0 $\mu$m A third aspect of the present invention is an electroluminescent display panel comprising: a first sheet having an electrode layer; and a second sheet having an electrode layer, arranged on the first sheet with a luminescent layer interposed between the first and second sheets so that the two electrode layers can face each other with the luminescent layer between them; wherein at least one of the first and second sheets is a transparent conductive film that comprises a transparent plastic film and a transparent conductive layer serving as the electrode layer, laminated to one surface of the transparent plastic film, the transparent conductive film, as a whole, having a haze value of 8 or less, at least one of the two surfaces of the transparent plastic film, that is, the surface to which the transparent conductive layer is laminated and the other surface, being provided with fine irregularities having a maximum height (Rmax) of 0.5 to 2.0 μm.

In the above-described second and third aspects of the present invention, it is preferable that the fine irregularities on the transparent conductive film have a ten-point mean roughness (Rz) of 0.35 to 1.5 μm.

A fourth aspect of the present invention is a process of producing a transparent conductive film, comprising the steps of laminating a transparent conductive layer to a surface of a transparent plastic film; interposing an ionizing-radiation-curing resin between the surface of the transparent plastic film, to which the transparent conductive layer is not laminated, and the die face of a die for providing irregularities, thereby laminating an ionizing-radiation-curing resin layer to this surface of the transparent plastic film; curing, by the application of ionizing radiation, the ionizing-radiation-curing resin layer interposed between the transparent plastic film and the die face of the die for providing irregularities, thereby adhering the ionizing-radiation-curing resin layer to the transparent plastic film; and separating, from the die for providing irregularities, the cured ionizing-radiation-curing resin layer and the transparent plastic film, the cured ionizing-radiation-curing resin layer being provided with fine irregularities that are the inverse of the irregularities of the die face of the die; wherein the irregularities of the die face of the die provide, on the exposed surface of the ionizing-radiation-curing resin layer, fine irregularities having a maximum height (Rmax) of 0.5 to 2.0 μm.

A fifth aspect of the present invention is a process of producing a transparent conductive film, comprising the steps of: interposing an ionizing-radiation-curing resin between one surface of a transparent plastic film and the die face of a die for providing irregularities, thereby laminating an ionizing-radiation-curing resin layer to this surface of the transparent plastic film; curing, by the application of ionizing radiation, the ionizing-radiation-curing resin layer interposed between the transparent plastic film and the die face of the die for providing irregularities, thereby adhering the ionizing-radiation-curing resin layer to the transparent plastic film; separating, from the die for providing irregularities, the cured ionizing-radiation-curing resin layer and the transparent plastic film, the cured ionizing-radiation-curing resin layer being provided with fine irregularities that are the inverse of the irregularities of the die face of the die; and laminating a transparent conductive layer to at least one of the two surfaces, that is, the surface of the transparent plastic film to which the ionizing-radiation-curing resin layer is not laminated and the exposed surface of the ionizing-radiation-curing resin layer; wherein the irregularities of the die face of the die provide, on the exposed surface of the ionizing-radiation-curing resin layer, fine irregularities having a maximum height (Rmax) of 0.5 to 2.0 μm.

In the above-described fourth and fifth aspects of the present invention, it is preferable that the fine irregularities that are the inverse of the irregularities of the die face of the die have a ten-point mean roughness (Rz) of 0.35 to 1.5 μm.

According to the first aspect of the present invention, while controlling the overall haze value of the transparent conductive film to 8 or less, fine irregularities having a maximum height (Rmax) of 0.5 to 2.0 μm are produced on at least one surface of the transparent plastic film, and on this or the other surface of the transparent plastic film, the transparent conductive layer is formed. Therefore, the transparent conductive film of the invention is free from those conventional problems that occur when a mat paint is applied. Moreover, the surface of the transparent plastic film on which the fine irregularities are provided has improved slipperiness, so that the transparent conductive film can be smoothly and stably produced without modifying a part of the production unit or adding any special means to the production unit. It is thus possible to provide a transparent conductive film capable of showing excellent display quality when used for a display or the like and good handling properties in the production process or the like.

In the first aspect of the present invention, if the fine irregularities are made to have a ten-point mean roughness (Rz) of 0.35 to 1.5 μm, the following advantages can be obtained in addition to the above-described effects: the surface of the transparent plastic film on which the fine irregularities are provided shows further improved slipperiness, and such troubles are effectively avoided that a screen on which the transparent conductive film is placed appears white and that an image on the screen visible through the transparent conductive film appears fuzzy.

Further, in the first aspect of the present invention, if the fine irregularities are provided as the surface structure of a transparent resin layer laminated to the surface of the transparent plastic film, they can be easily and securely provided on the surface of the transparent plastic film by using a die whose die face has irregularities suitable for providing the fine irregularities and a transparent resin.

Furthermore, in the first aspect of the present invention, by laminating a hard coat layer to the surface of the transparent plastic film to which the transparent conductive layer is not laminated, it is possible to obtain, in addition to the above-described effects, the effect of effectively enforcing the surface of the transparent plastic film opposite to the surface to which the transparent conductive layer is laminated. By providing the fine irregularities on the surface of the transparent plastic film to which the transparent conductive layer is laminated, and by making the surface of the transparent plastic film to which the hard coat layer is laminated smooth so that the exposed surface of the hard coat layer can be a mirror surface, it is possible to improve both the slipperiness of the surface of the transparent plastic film to which the transparent conductive layer is laminated and the physical and chemical properties of the other surface of the transparent plastic film.

According to the second aspect of the present invention, the transparent conductive film according to the aforementioned first aspect is used as at least one of the pair of sheets having electrodes, constituting the touch panel. The transparent conductive film shows good slipperiness when its surface having the fine irregularities is processed, so that it is possible to easily produce the touch panel.

According to the third aspect of the present invention, the transparent conductive film according to the aforementioned first aspect is used as at least one of the pair of sheets having electrodes, constituting the electroluminescent display panel. Since the surface of the transparent conductive film on which the fine irregularities are provided is excellent in slipperiness, the electroluminescent display panel can easily be produced.

In the second and third aspects of the present invention, by making the ten-point mean roughness (Rz) of the fine irregularities provided on the transparent conductive film between 0.35 μm and 1.5 μm, it is possible to obtain, in addition to the above-described effects, the effect of further improving the slipperiness of the surface of the transparent conductive film on which the fine irregularities are provided. Moreover, it is possible to obtain a touch panel or electroluminescent display panel capable of effectively overcoming such drawbacks that its screen appears white and that an image displayed on the screen appears fuzzy.

According to the fourth aspect of the present invention, after laminating the transparent conductive layer to one surface of the transparent plastic film, the ionizing-radiation-curing resin is interposed between the surface of the transparent plastic film opposite to the above-described surface and the die face of the die for providing fine irregularities having a maximum height (Rmax) of 0.5 to 2.0 μm, and is cured by the application of ionizing radiation to form the cured ionizing-radiation-curing resin layer, which is then separated from the die. Therefore, the surface of the transparent plastic film on which the fine irregularities are provided shows improved slipperiness, so that it is possible to produce smoothly and stably the transparent conductive film without modifying a part of the production unit or adding any particular means to the production unit. There can thus be easily and securely obtained a transparent conductive film free from those problems that occur when a mat paint is applied.

According to the fifth aspect of the present invention, after interposing the ionizing-radiation-curing resin between one surface of the transparent plastic film and the die face of the die for providing fine irregularities having a maximum height (Rmax) of 0.5 to 2.0 μm and curing the resin by the application of ionizing radiation to form the cured ionizing-radiation-curing resin layer, which is then separated from the die, the transparent conductive layer is laminated to at least one of the two surfaces, that is, the surface of the transparent plastic film to which the ionizing-radiation-curing resin layer is not laminated and the exposed surface of the ionizing-radiation-curing resin layer. Therefore, the surface of the transparent plastic film on which the fine irregularities are provided shows improved slipperiness, so that it is possible to produce smoothly and stably the transparent conductive film without modifying a part of the production unit or adding any particular means to the production unit. There can thus be easily and securely obtained a transparent conductive film free from those problems that occur when a mat paint is applied.

In the fourth and fifth aspects of the present invention, by making the ten-point mean roughness (Rz) of the fine irregularities that are the inverse of the irregularities of the die face of the die between 0.35 μm and 1.5 μm, it is possible to obtain, in addition to the above-described effects, the effect of further improving the slipperiness of the surface of the transparent plastic film on which the fine irregularities are provided. Moreover, it becomes possible to obtain a transparent conductive film capable of effectively overcoming such drawbacks that a screen on which the transparent conductive film is placed appears white and that an image on the screen visible through the transparent conductive film appears fuzzy.

DETAILED DESCRIPTION OF PREFERRED EMBODIMENTS

By referring now to the accompanying drawings, embodiments of the present invention will be described hereinafter.

(Overall Construction of Transparent Conductive Film)

Figure 1A:
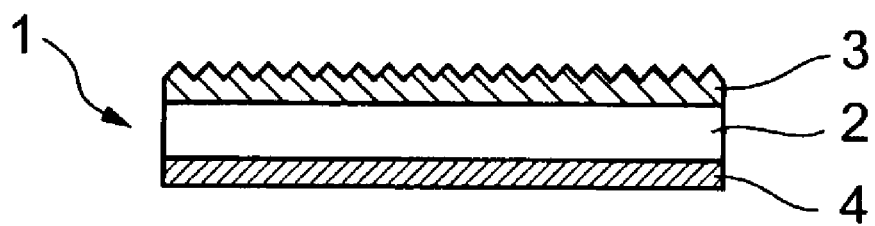
FIGS. 1A and 1B are diagrammatic cross-sectional views showing transparent conductive films according to an embodiment of the present invention.

FIG. 1A is a view showing a transparent conductive film according to an embodiment of the present invention. In a transparent conductive film 1 shown in this figure, a fine irregularity layer (transparent resin layer) 3 having fine irregularities on its exposed surface is laminated to one surface (the upper surface in the case shown in the figure) of a transparent plastic film 2; and a transparent conductive layer 4 is laminated to the other surface (the lower surface in the case shown in the figure) of the transparent plastic film 2 to which the fine irregularity layer 3 is not laminated. The expressions "upper surface", "lower surface", "upper" and "lower" as used when referring to the drawings are only for explanation and are independent of the upper-lower relationship at the time when the transparent conductive film 1 is practically used.

Figure 1B:
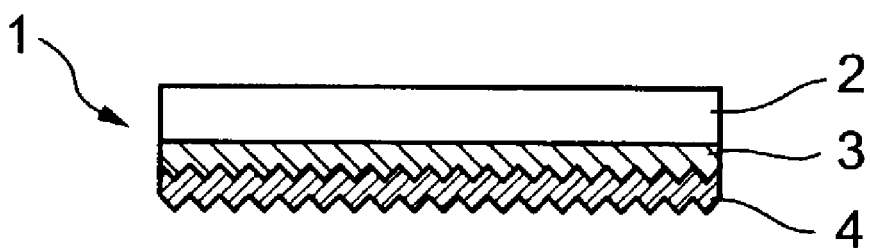

In the transparent conductive film 1 according to this embodiment, it is not always required to laminate the transparent conductive layer 4 to the surface of the transparent plastic film 2 on which the fine irregularities are not provided. Specifically, as shown in FIG. 1B, after laminating the fine irregularity layer 3 having fine irregularities on its exposed surface, to one surface (the lower surface in the case shown in the figure) of the transparent plastic film 2, the transparent conductive layer 4 may be laminated to the fine irregularity layer 3 along its fine irregularities. In this case, the exposed surface of the transparent conductive layer 4 is roughened by the fine irregularities of the fine irregularity layer 3 because the transparent conductive layer 4 is extremely thin.

Figure 2:
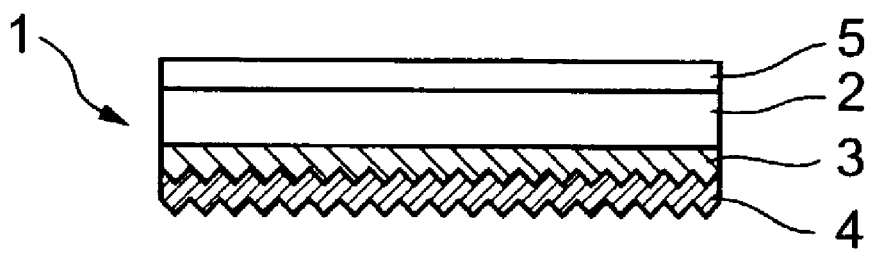
FIG. 2 is a diagrammatic cross-sectional view showing a modification of the transparent conductive films shown in FIGS. 1A and 1B.

Further, in the transparent conductive film 1 according to this embodiment, if the transparent conductive layer 4 is laminated to the fine irregularity layer 3 along its fine irregularities, a transparent hard coat layer 5 may be laminated, as shown in FIG. 2, to the surface (the upper surface in the case shown in the figure) of the transparent plastic film 2 to which neither the fine irregularity layer 3 nor the transparent conductive layer 4 is laminated. In the transparent conductive film 1 shown in FIG. 2, the surface of the transparent plastic film 2 to which the transparent hard coat layer 5 is laminated is made smooth so that the exposed surface of the transparent hard coat layer 5 can be a mirror surface.

In the case where the fine irregularity layer 3 and the transparent conductive layer 4 are laminated to the upper and lower surfaces of the transparent plastic film 2, respectively, as shown in FIG. 1A, the transparent hard coat layer 5 may be laminated to the fine irregularity layer 3 along its fine irregularities. Alternatively, a transparent hard coat layer having fine irregularities on its exposed surface may be directly laminated to the upper surface of the transparent plastic film 2 so that it can function as both the fine irregularity layer and the transparent hard coat layer.

In the transparent conductive films 1 shown in FIGS. 1A, 1B and 2, the fine irregularities are provided as the surface structure of the fine irregularity layer 3 laminated to the surface of the transparent plastic film 2. However, the fine irregularities may also be provided as the surface structure of the transparent plastic film 2 itself. In general, the transparent plastic film 2 is mass-produced as a film having a smooth surface. Therefore, from the viewpoint of convenience in the production process, it is preferable to laminate, by applying a resin composition or the like, a transparent resin layer to a transparent plastic film having a smooth surface, thereby forming the fine irregularities as the surface structure of the transparent resin layer.

It is preferable that the overall haze value of the transparent conductive film 1 be 8 or less. Since the lower limit of the haze value varies depending also upon the haze value of the transparent plastic film 2, substrate, itself, it is not easy to sweepingly specify it; however, the haze value of the transparent conductive film 1 is practically 0.5 or more.

Preferably, the fine irregularities provided on at least one surface of the transparent plastic film 2 by means of the fine irregularity layer 3 or the like have a maximum height (Rmax) of 0.5 to 2.0 $\mu$m. More preferably, these fine irregularities have a maximum height (Rmax) of 0.5 to 2.0 $\mu$m and a ten-point mean roughness (Rz) of 0.35 to 1.5 $\mu$m. The maximum height (Rmax) herein refers to the distance between the deepest valley and the highest peak of the irregularities on a sampled portion with a specified length; and the ten-point mean roughness (Rz) herein refers to the average value of the heights of five highest peaks and the depths of five deepest valleys of the irregularities on a sampled portion with a specified length (see JIS B0601, "Surface Roughness —Definitions and Designation"). Plainly speaking, the height of fine irregularities that will not become the cause of blocking can be specified by the maximum height (Rmax), while the density of fine irregularities that will not become the cause of blocking can be specified by the ten-point mean roughness (Rz).

If the maximum height (Rmax) of the fine irregularities is less than 0.5 $\mu$m, the irregularities are excessively low in height, so that blocking tends to occur while processing the transparent plastic film by a roll-to-roll method (a method comprising: unwinding a continuous substrate such as a transparent plastic film; forming a transparent conductive layer on the substrate under vacuum by deposition, sputtering or the like; and winding, around a roll, the transparent conductive film obtained). Consequently, such a problem occurs that the transparent conductive layer cannot be smoothly and stably formed on the transparent plastic film.

On the other hand, if the transparent conductive film has fine irregularities whose maximum height (Rmax) is in excess of 2.0 $\mu$m, it greatly scatters extraneous light. As a result, a screen on which the transparent conductive film is placed appears white; and an image on the screen visible through the transparent conductive film thus has lowered contrast. Further, the image on the display visible through the transparent conductive film is greatly diffused due to the surface roughness of the film, so that it is seen with decreased sharpness. Furthermore, in the case where such a transparent conductive film is used for a touch panel or the like, short-circuit occurs depending upon the height of a spacer provided to separate two facing electrode layers in the touch panel.

When the fine irregularities have a ten-point mean roughness (Rz) of less than 0.35 $\mu$m, the density of the fine irregularities is excessively low, so that blocking tends to occur while processing the transparent plastic film by the above-described roll-to-roll method. As a result, such a problem occurs that the transparent conductive layer cannot be smoothly and stably formed on the transparent plastic film.

On the other hand, if the transparent conductive film has fine irregularities whose ten-point mean roughness (Rz) is in excess of 1.5 $\mu$m, it greatly scatters extraneous light. As a result, a screen on which the transparent conductive film is placed appears white; and an image on the screen visible through the transparent conductive film thus has lowered contrast. Moreover, the image on the display visible through the transparent conductive film is greatly diffused due to the surface roughness of the film, so that it is seen with decreased sharpness.

In the transparent conductive film 1 according to this embodiment, in order to overcome the drawbacks in the related art, it is preferable to provide the fine irregularities on the transparent resin layer without using organic or inorganic fine beads usually used for providing irregularities. Specifically, the fine irregularities can be provided by embossing, in which an embossing plate (preferably, an embossing roller) is pressed, optionally with heating, onto a transparent resin layer that has been or is being formed. More preferably, a die whose die face has irregularities that are the inverse of the desired fine irregularities to be provided, is filled with a transparent resin excellent in curing characteristics, such as an ultraviolet-light-curing resin, and is covered with a transparent plastic film; thereafter, ultraviolet light is applied to cure the transparent resin in the die and, at the same time, to integrate the transparent resin and the transparent plastic film into one, from which the die is then separated.

To provide the fine irregularities, the die for providing irregularities may be pressed onto the transparent resin that has been applied to the transparent plastic film, or the application of the transparent resin and the lamination of the transparent resin layer may be simultaneously conducted by feeding the transparent resin between the transparent plastic film and the die for providing irregularities. Namely, any technique can be employed as long as the transparent resin can be interposed between the transparent plastic film and the die for providing irregularities. Such a technique is superior to the conventional embossing technique, particularly in terms of the reproduction of the configuration of a die face, so that it can impart the desired optical properties more easily. Moreover, although a surface roughened by the conventional embossing technique is disadvantageous in that it returns to its original smooth surface with time, a surface provided with irregularities by a technique in which a transparent resin is interposed between a transparent plastic film and a die for providing irregularities is free from such a disadvantage. A fine irregularity layer having fine irregularities, showing sufficiently high hardness can thus be obtained by the latter technique.

(Process of Producing Transparent Conductive Film)

A process of producing the transparent conductive film 1 as shown in FIG. 1A, 1B or 2 will be described by referring to FIG. 3.

Figure 3:
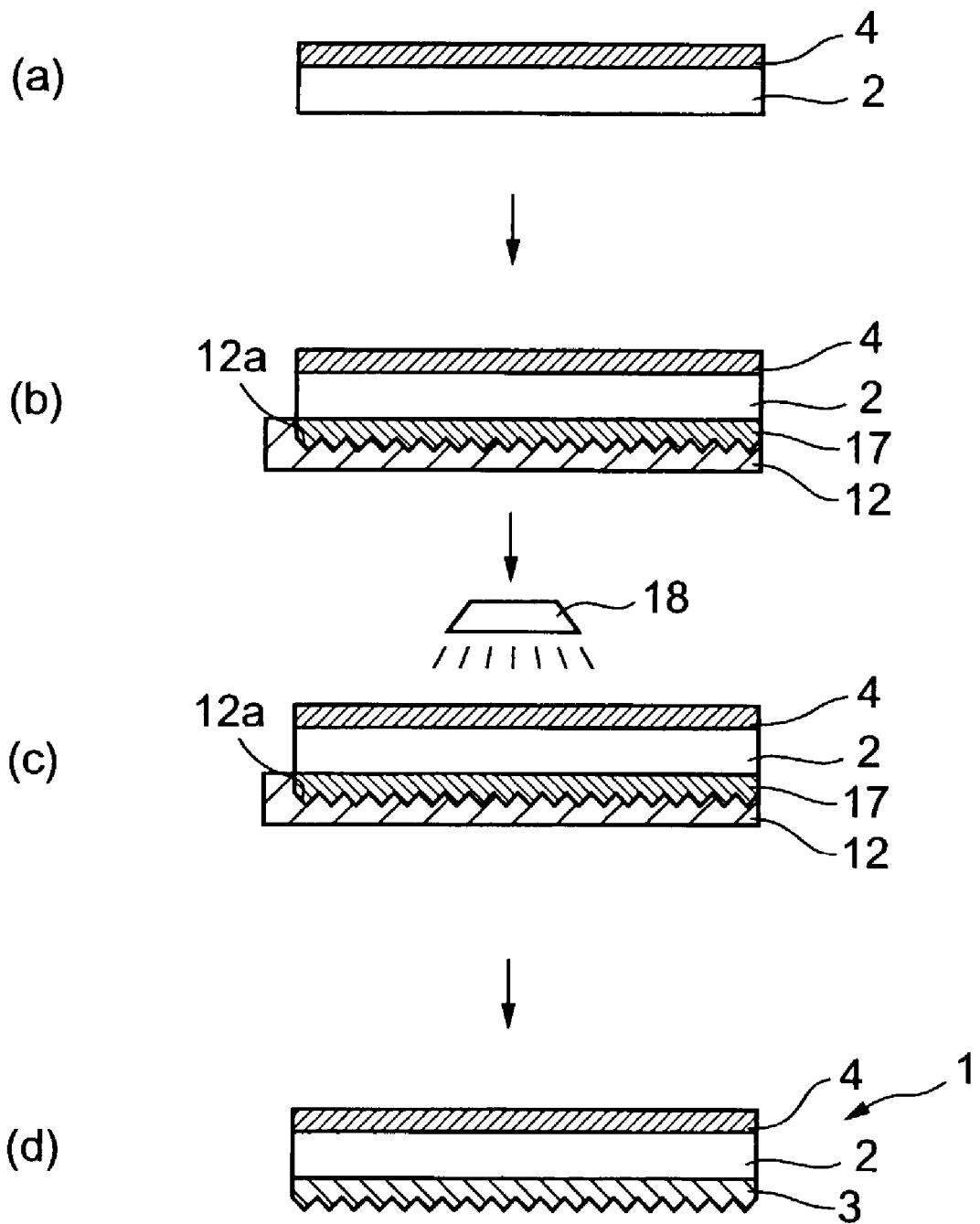
FIG. 3 is a flowchart illustrating a process of producing a transparent conductive film according to an embodiment of the present invention.

As shown in FIG. 3, after laminating a transparent conductive layer 4 to one surface of a transparent plastic film 2 (FIG. 3(a)), an ionizing-radiation-curing resin is interposed between the surface of the transparent plastic film 2 to which the transparent conductive layer 4 is not laminated and the die face 12a of a die 12 for providing irregularities, thereby laminating an ionizing-radiation-curing resin layer 17 to this surface of the transparent plastic film 2 (FIG. 3(b)). The irregularities of the die face 12a of the die 12 for providing irregularities are suitable for forming, on the exposed surface of the ionizing-radiation-curing resin layer 17, fine irregularities having a maximum height (Rmax) of 0.5 to 2.0 μm. More preferably, the fine irregularities that are the inverse of the irregularities of the die face 12a of the die 12 for providing irregularities have a ten-point mean roughness (Rz) of 0.35 to 1.5 μm.

By using an ultraviolet light irradiator 18, ultraviolet light is then applied to the ionizing-radiation-curing resin layer 17 interposed between the transparent plastic film 2 and the die face 12a of the die 12 for providing irregularities. The ionizing-radiation-curing resin layer 17 is thus cured, and, at the same time, is adhered to the transparent plastic film 2 (FIG. 3(c)).

Lastly, the cured ionizing-radiation-curing resin layer (fine irregularity layer 3') provided with the fine irregularities that are the inverse of the irregularities of the die face 12a of the die 12 for providing irregularities is separated, together with the transparent plastic film 2, from the die face 12a of the die 12, thereby obtaining a transparent conductive film 1 composed of the transparent plastic film 2, the fine irregularity layer 3 and the transparent conductive layer 4 (FIG. 3(d)).

In the production process shown in FIG. 3, the transparent conductive layer 4 is laminated to one surface of the transparent plastic film 2 before forming the fine irregularity layer 3 on the other surface of the transparent plastic film 2. However, the transparent conductive layer 4 may also be laminated in the following manner: as shown in FIG. 4, after forming the fine irregularity layer 3 on one surface of the transparent plastic film 2 (FIGS. 4(a), (b) and (c)), the transparent conductive layer 4 is laminated to the exposed surface of the fine irregularity layer 3 (FIG. (d)), or to the surface of the transparent plastic film 2 to which the fine irregularity layer 3 is not laminated (FIG. 4(e)).

Figure 4:
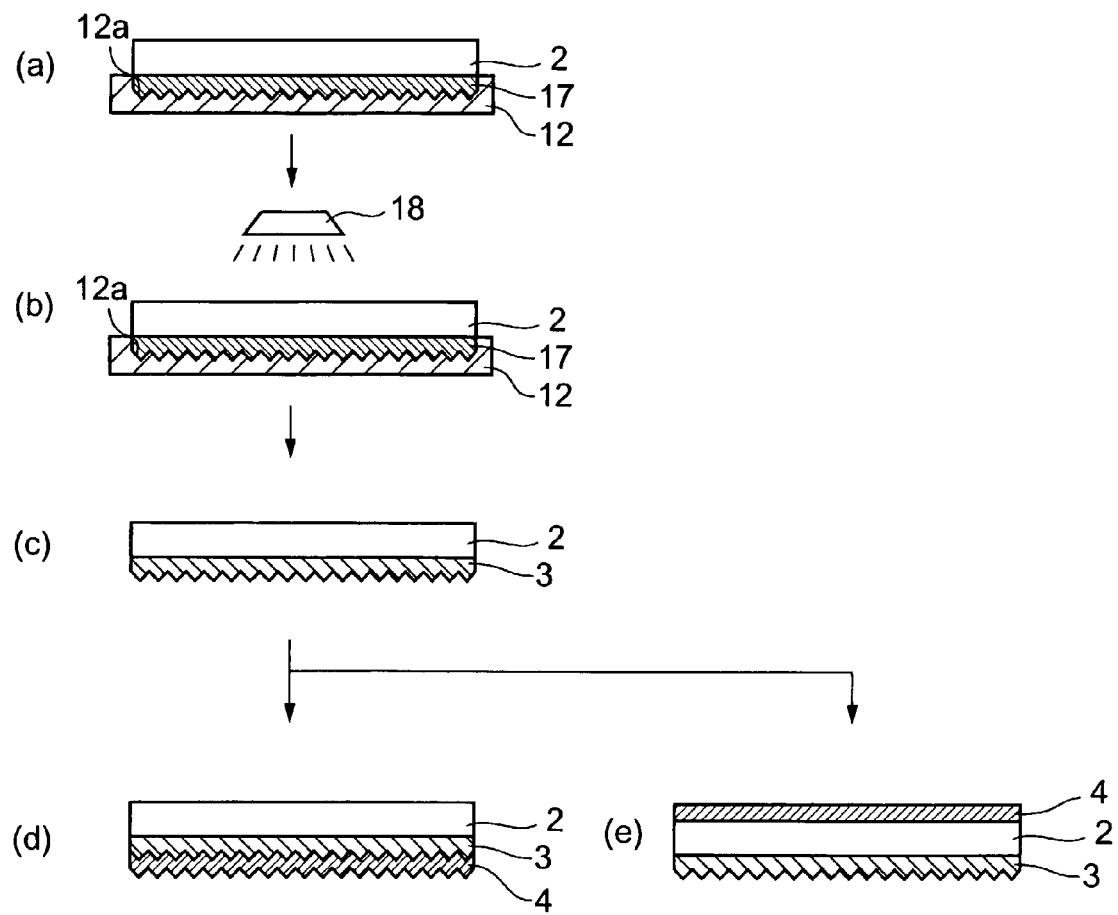
FIG. 4 is a flowchart illustrating another process of producing a transparent conductive film according to an embodiment of the present invention.
Figure 5:
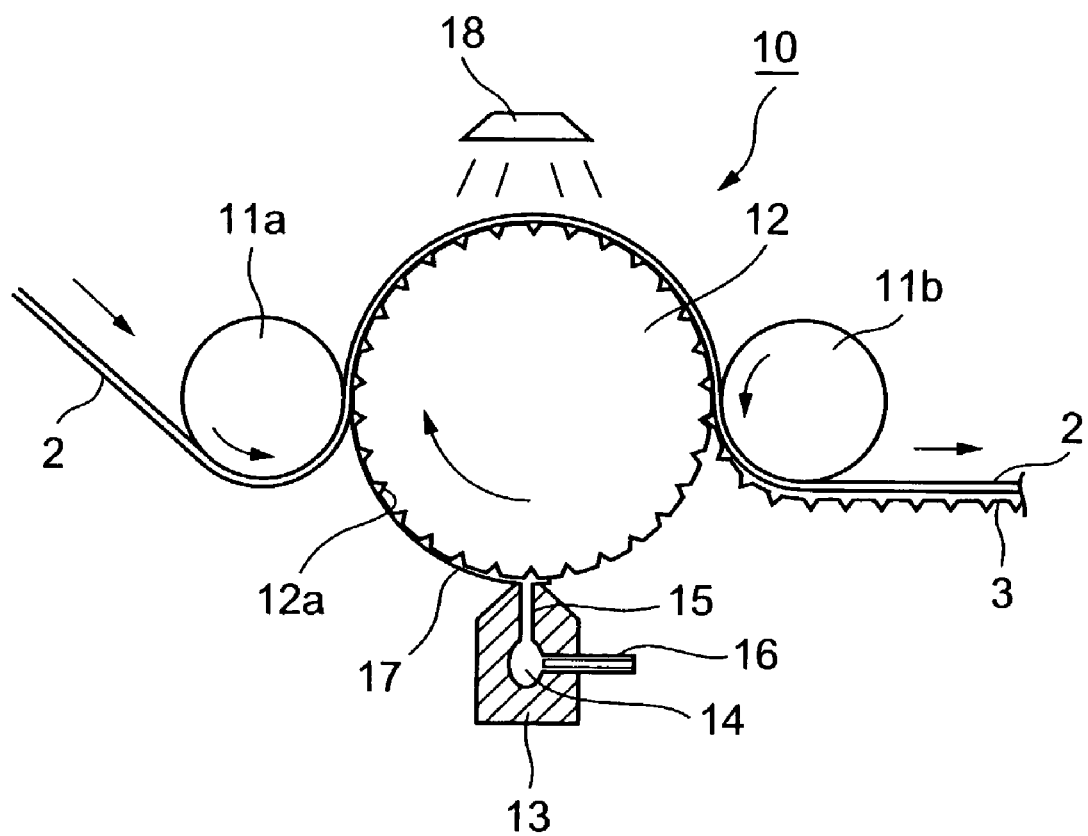
FIG. 5 is a view showing a production unit useful for producing a transparent conductive film according to an embodiment of the present invention.

The production processes shown in FIGS. 3 and 4 can be conveniently effected by the use of an embossing machine 10 as shown in FIG. 5. The embossing machine 10 shown in this figure is useful for forming the fine irregularity layer 3 on the surface of the transparent plastic film 2 by using an ultraviolet-light-curing resin (ionizing-radiation-curing resin).

As shown in FIG. 5, a transparent plastic film 2 unrolled at the upper left-hand corner of the figure is delivered toward an embossing roller (die for providing irregularities) 12. The embossing roller 12 has a surface (die face) 12a provided with irregularities that are the inverse of the desired fine irregularities to be provided.

A coating head 13 is placed under the embossing roller 12, and an ultraviolet-light-curing resin 14 is fed to the coating head 13 from a reservoir (not shown in the figure) through a pipe 16. The ultraviolet-light-curing resin 14 fed is forced out from the coating head 13 situated right under the embossing roller 12, through a slit 15 facing to the top of the coating head 13, and is applied to the roughened surface (die face) 12a of the embossing roller 12. Thereafter, this ultraviolet-light-curing resin applied is shifted to the upper left hand as embossing roller 12 rotates (clockwise rotation in the case shown in the figure) and is laminated as an ultraviolet-light-curing resin layer 17 to the transparent plastic film 2 in a space between the embossing roller 12 and a nip roller 11a situated on the transparent-plastic-film-unrolling side.

Instead of laminating the transparent plastic film 2 to the ultraviolet-light-curing resin layer 17 after forming the ultraviolet-light-curing resin layer 17 on the surface (die face) 12a of the embossing roller 12, the transparent plastic film 2 and the ultraviolet-light-curing resin layer 17 may be laminated to each other in such a manner that the transparent plastic film 2 is wound around the embossing roller 12 while feeding the ultraviolet-light-curing resin 14 between the transparent plastic film 2 and the embossing roller 12.

Thereafter, the laminate of the transparent plastic film 2 and the ultraviolet-light-curing resin layer 17 is delivered to the top of the embossing roller 12, where ultraviolet light is applied to the ultraviolet-light-curing resin layer 17 by using an ultraviolet light irradiator 18 placed above the embossing roller 12. The ultraviolet-light-curing resin layer 17 is thus cured, and, at the same time, adhered to the transparent plastic film 2.

The laminate of the transparent plastic film 2 and the cured ultraviolet-light-curing resin layer 17 is then delivered to the right hand of the embossing roller 12, and is separated from the embossing roller 12 by a separation roller 11b. Thus, there can be obtained a film, a laminate of the transparent plastic film 2 and the fine irregularity layer 3 which is the cured ultraviolet-light-curing resin layer provided with fine irregularities that are the inverse of the irregularities of the surface 12a of the embossing roller 12.

To finally obtain a transparent conductive film 1, a transparent conductive layer 4 and, if necessary, a transparent hard coat layer 5 are laminated to the surface of the above-obtained film, as shown in FIG. 1A, 1B or 2. To obtain a transparent conductive film as shown in FIG. 1A, in which a transparent conductive layer 4 is laminated to the surface of the transparent plastic film 2 to which the fine irregularity layer 3 is not laminated, the transparent conductive layer 4 may be laminated before or after forming the fine irregularity layer 3 in the above-described manner. On the other hand, to obtain a transparent conductive film 1 as shown in FIG. 1B or 2, in which the fine irregularity layer 3 and the transparent conductive layer 4 are formed on one surface of the transparent plastic film 2, the transparent conductive layer 4 should be laminated after forming the fine irregularity layer 3 in the above-described manner. In the case where a transparent hard coat layer 5 is laminated, as shown in FIG. 2, to the surface of the transparent plastic film 2 to which the fine irregularity layer 3 and the transparent conductive layer 4 are not laminated, the lamination of the transparent hard coat layer 5 may be conducted before the lamination of the fine irregularity layer 3, or between the lamination of the fine irregularity layer 3 and that of the transparent conductive layer 4, or after the lamination of the transparent conductive layer 4.

(Transparent Plastic Film)

The transparent plastic film 2, the fine irregularity layer 3, the transparent conductive layer 4 and other layers contained in the transparent conductive film 1 according to this embodiment will be explained in detail.

First of all, the transparent plastic film 2 will be explained.

Preferred as the transparent plastic film 2 is a film of a thermoplastic resin such as cellulose diacetate, cellulose triacetate, cellulose acetate butyrate, polyamide, polyimide, polyether sulfone, polysulfone, polypropylene, polymethylpentene, polyvinyl chloride, polyvinyl acetal, polyether ketone, polymethyl methacrylate, polycarbonate, polyester (e.g., polyethylene terephthalate) or polyurethane.

Of these, a film of a polyester resin such as polyethylene terephthalate resin, which is often used for a photographic film containing an emulsion layer, is preferred when mechanical strength and coating properties are taken into consideration. A cellulose triacetate resin film is also preferred because it has high transparency, no optical anisotropy and low refractive index. A polycarbonate resin film is also preferred because it has transparency and heat resistance.

The above-described thermoplastic resin films have flexibility and are convenient for use. However, in the case where it is not necessary to bend the transparent plastic film at all even when it is handled, and if the transparent plastic film is desired to have high hardness, a plate of any of the above-enumerated resins, a glass plate or the like may also be used.

The thickness of the transparent plastic film 2 is preferably about 8 to 1000 $\mu$m, more preferably about 50 to 200 $\mu$m. In the case where a plate-shaped material is used as the transparent plastic film 2, it may have a thickness exceeding the above-described range.

To improve the adhesion to a layer to be laminated to the transparent plastic film 2, either one of or both surfaces of the transparent plastic film 2 may be subjected to any of various conventional treatments, for example, physical treatments such as corona discharge treatment and oxidization treatment, and a primer-layer-forming treatment in which a coating agent called an anchoring agent or primer is applied.

To avoid lowering of display visibility, the transparent plastic film 2 preferably has a total light transmittance of 80% or more, more preferably 90% or more.

(Fine Irregularity Layer)

Next, the fine irregularity layer 3 will be explained.

To form the fine irregularity layer 3, it is possible to use any of resin compositions broadly called ionizing-radiation-curing resin compositions including ultraviolet-light-curing resin compositions and electron-beam-curing resin compositions.

A proper mixture of prepolymers, oligomers and/or monomers having in their molecules polymerizable unsaturated bonds or epoxy group is used as the ionizing-radiation-curing resin composition. Any of those magnetic waves or charged particle beams having energy quanta high enough to polymerize or cross-link the molecules can be used as ionizing radiation to be applied for curing, and ultraviolet light or an electron beam is usually used.

Examples of prepolymers and oligomers in the ionizing-radiation-curing resin composition include: (1) unsaturated polyesters such as condensation products between unsaturated dicarboxylic acids and polyhydric alcohols; (2) methacrylates such as polyester methacrylate, polyether methacrylate, polyol methacrylate and melamine methacrylate; (3) acrylates such as polyester acrylate, epoxy acrylate, urethane acrylate; polyether acrylate, polyol acrylate and melamine acrylate; and (4) cationically polymerizable epoxy compounds.

Examples of monomers in the ionizing-radiation-curing resin compositions include: (1) styrene monomers such as styrene and a-methyl-styrene; (2) acrylic esters such as methyl acrylate, 2-ethylhexyl acrylate, methoxyethyl acrylate, butoxyethyl acrylate, butyl acrylate, methoxybutyl acrylate and phenyl acrylate; (3) methacrylic esters such as methyl methacrylate, ethyl methacrylate, propyl methacrylate, methoxyethyl methacrylate, ethoxyethyl methacrylate, phenyl methacrylate and lauryl methacrylate; (4) amino-substituted alcohol esters such as 2-(N,N-diethylamino) ethyl acrylate, 2-(N,N-dimethylamino)ethyl acrylate, 2-(N, N-dibenzylamino)methyl acrylate and 2-(N,N-diethylamino)propyl acrylate; (5) unsaturated carboxylic acid amides such as acrylamide and methacrylamide; (6) compounds such as ethylene glycol diacrylate, propylene glycol diacrylate, neopentyl glycol diacrylate, 1,6-hexanediol diacrylate and triethylene glycol diacrylate; (7) polyfunctional compounds such as dipropylene glycol diacrylate, ethylene glycol diacrylate, propylene glycol dimethacrylate and diethylene glycol dimethacrylate; and (8) polythiol compounds having two or more thiol groups in one molecule, such as trimethylolpropane trithioglycolate, trimethylolpropane trithiopropylate and pentaerythritol tetrathioglycolate.

In general, any one of or two or more of the above-enumerated monomers are used in the ionizing-radiation-curing resin composition. To impart proper coating properties to the ionizing-radiation-curing resin composition, it is preferable to make the ionizing-radiation-curing resin composition contain 5% by weight or more of prepolymers or oligomers selected from the above-described ones and 95% by weight or less of monomers and/or polythiol compounds selected from the above-described ones.

If the ionizing-radiation-curing resin composition is required to show flexibility after it has been cured, it is proper to decrease the amount of monomers to be incorporated into the ionizing-radiation-curing resin composition or use an acrylate monomer having one or two functional groups. If the cured ionizing-radiation-curing resin composition is required to have resistance to wear, heat or solvents, it is proper to use an acrylate monomer having three or more functional groups. Thus, it is possible to suitably design the ionizing-radiation-curing resin composition. Examples of acrylate monomers having one functional group include 2-hydroxy acrylate, 2-hexyl acrylate and phenoxyethyl acrylate. Examples of acrylate monomers having two functional groups include ethylene glycol diacrylate and 1,6-hexanediol diacrylate. Examples of acrylate monomers having three or more functional groups include trimethylolpropane triacrylate, pentaerythritol triacrylate, pentaerythritol tetraacrylate, and dipentaerythritol hexaacrylate.

To control the physical properties, such as flexibility and surface hardness, of the cured ionizing-radiation-curing resin composition, a resin that is not cured by the application of ionizing radiation may be added to the ionizing-radiation-curing resin composition. Specific examples of such resins include thermoplastic resins such as polyurethane resins, cellulose resins, polyvinyl butyral resins, polyester resins, acrylic resins, polyvinyl chloride resins and polyvinyl acetate resins of these, polyurethane resins, cellulose resins and polyvinyl butyral resins are preferred from the viewpoint of improvement in flexibility.

To cure the ionizing-radiation-curing resin composition by the application of light, especially ultraviolet light, it is proper to incorporate a photopolymerization initiator or accelerator into the ionizing-radiation-curing resin composition. To an ionizing-radiation-curing resin composition composed of resins having radically polymerizable unsaturated groups, acetophenones, benzophenones, Michler's benzoylbenzoate, α-amyloxime ester, thioxanethones, benzoin, benzoin methyl ether, etc. may be added either singly or in combination as the photopolymerization initiator. To an ionizing-radiation-curing resin composition composed of resins having cationically polymerizable unsaturated groups, aromatic diazonium salts, aromatic sulfonium salts, aromatic iodonium salts, metallocene compounds, benzoin-sulfonic esters, etc. may be added either singly or in combination as the photopolymerization initiator. The amount of the photopolymerization initiator to be added is from 0.1 to 10 parts by weight for 100 parts by weight of the ionizing-radiation-curing resin composition. In addition to the photopolymerization initiator, n-butylamine, triethylamine, tri-n-butyl-phosphine or the like may be added as a sensitizer.

Any of the organic reactive silicon compounds as described below may also be incorporated into the ionizing-radiation-curing resin composition.

Included in a first group of organic silicon compounds that can be incorporated into the ionizing-radiation-curing resin composition are those compounds represented by the general formula $R_m Si(OR')_n$, wherein R and R' represent an alkyl group having 1 to 10 carbon atoms; and the subscripts m and n for R and R', respectively, are integers that fulfil the relationship m+n=4. Specific examples of such organic silicon compounds include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltriethoxysilane, methyltripropoxysilane, methyltributoxysilane, dimethyldimethoxysilane, dimethyl-diethoxysilane, dimethylethoxysilane, dimethylmethoxysilane, dimethyl-propoxysilane, dimethylbutoxysilane, methyldimethoxysilane, methyl-diethoxysilane and hexyltrimethoxysilane.

A second group of organic silicon compounds that can be incorporated into the ionizing-radiation-curing resin composition includes silane coupling agents. Specific examples of such organic silicon compounds include γ-(2-aminoethyl)aminopropyltrimethoxysilane, γ-(2-aminoethyl)aminopropyl-methyldimethoxysilane, β-(3,4-epoxycyclohexyl)ethyl-trimethoxysilane, γ-aminopropyltriethoxysilane, γ-methacryloxypropylmethoxysilane, N-β-(N-vinylbenzylaminoethyl)-γ-aminopropylmethoxysilane hydrochloric acid, γ-glycidoxypropyltrimethoxysilane, aminosilane, methylmethoxysilane, vinyl-triacetoxysilane, γ-mercaptopropyltrimethoxysilane, γ-chloropropyl-trimethoxysilane, hexamethyldisilazane, vinyltris(β-methoxyethoxy)silane, octadecyldimethyl [3-(trimethoxysilyl)propyl]ammonium chloride, methyl-trichlorosilane and dimethyldichlorosilane.

A third group of organic silicon compounds that can be incorporated into the ionizing-radiation-curing resin composition includes ionizing-radiation-curing silicon compounds. Specific examples of such compounds include organic silicon compounds having molecular weights of 5,000 or less, containing a plurality of functional groups which are reacted and crosslinked by the application of ionizing radiation, for example, polymerizable double bonds. More specific examples of these compounds include polysilanes having a vinyl functional group at one end, polysilanes having vinyl functional groups at both ends, polysiloxanes having a vinyl functional group at one end, polysiloxanes having vinyl functional groups at both ends, vinyl functional polysilanes obtained by reacting these polysilane compounds, and vinyl functional polysiloxanes obtained by reacting these polysiloxane compounds. More specifically, the above-described organic silicon compounds are as follows:

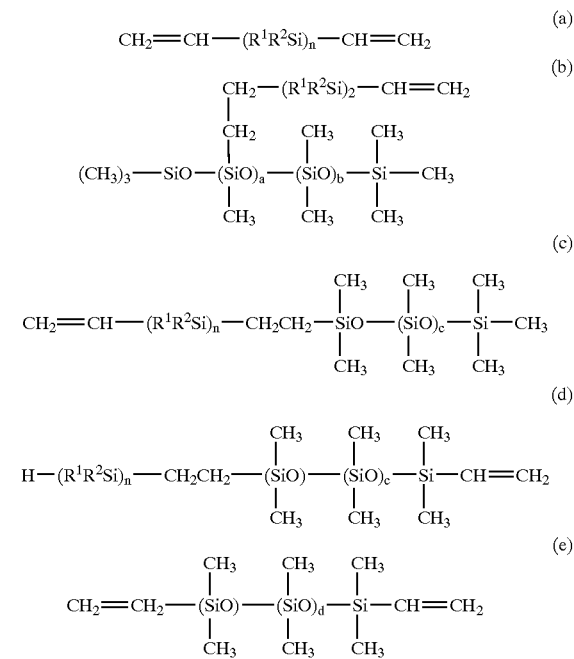

In the above formulas (a) to (e), $R^1$ and $R^2$ represent an alkyl group having 1 to 4 carbon atoms, and a–d and n are a number that makes the molecular weight 5,000 or less.

In addition to the above-enumerated compounds, (meth)acryloxy-silane compounds such as 3-(meth)acryloxypropyltrimethoxysilane and 3-(meth)acryloxypropylmethyldimethoxysilane can be mentioned as organic silicon compounds that can be incorporated into the ionizing-radiation-curing resin composition.

In the embossing machine 10 shown in FIG. 5, the embossing roller 12 is used for forming the fine irregularity layer 3. However, an embossing plate may also be used instead of the embossing roller 12 to form the fine irregularity layer 3. The surface (die face) of the embossing roller or plate (die for providing irregularities) may be roughened by one of various techniques, for example, sandblasting or beads shot blasting.

Those fine irregularities of the fine irregularity layer 3 produced by the use of a die whose die face has been roughened by sandblasting are in such a state that a large number of depressions are distributed on a surface. On the other hand, those fine irregularities of the fine irregularity layer 3 produced by the use of a die whose die face has been roughened by beads shot blasting is in such a state that a large number of protrusions are distributed on a surface.

According to our knowledge, when the fine irregularity layer 3 having many protrusions distributed on a surface is compared with that having many depressions distributed on a surface, the former is lower in haze and less reflects an interior lighting, etc. than the latter even if the mean roughness (e.g., ten-point mean roughness (Rz)) of the former and that of the latter are the same. For this reason, it is more preferable that the fine irregularities on the transparent conductive film 1 according to this embodiment be those ones produced by using a die whose die face has been roughened by beads shot blasting, that is, such irregularities that the number per unit area of protrusions is greater than that of depressions. Namely, in the process of producing the transparent conductive film 1 according to this embodiment, a die having a die face roughened to have irregularities that are the inverse of the fine irregularities to be provided on the transparent conductive film 1, that is, a die whose die face has been roughened by beads shot blasting to make the number per unit area of depressions greater than that of protrusions, is more preferably used as the die for providing irregularities. Preferably, the die face of the die for providing irregularities has irregularities that are the inverse of fine irregularities to be provided on the transparent conductive film 1 and that can provide, on the exposed surface of the ionizing-radiation-curing resin layer, fine irregularities having a maximum height (Rmax) of 0.5 to 2.0 $\mu$m. More preferably, the die face of the die for providing irregularities is suitable for providing, on the exposed surface of the ionizing-radiation-curing resin layer, fine irregularities having a maximum height (Rmax) of 0.5 to 2.0 $\mu$m and a ten-point mean roughness (Rz) of 0.35 to 1.5 $\mu$m.

A metal, plastic, wood or a composite of these materials is used to make the die for providing irregularities. Chromium is a metal preferable for this purpose because it has high strength and is hardly abraded while repeatedly used; and a chromium-plated iron-made roller is suitable from the economical point of view.

Metallic particles or inorganic particles such as silica, alumina or glass beads are suitable as the particles (i.e., beads) for use in shot blasting. It is preferable that the sizes (diameters) of these particles be from approximately 100 to 300 $\mu$m. These particles are blown over a material for the die together with a high-speed gas. At this time, a proper liquid (e.g., water) may be used along with the gas to blow particles other than glass beads. If a liquid is used in combination with the gas, the resulting die can have a more uniformly roughened die face. If a liquid is used together with the gas to blow glass beads, the glass beads cohere, so that it becomes difficult to conduct shot blasting.

It is preferable to use the die 12 for providing irregularities after plating its roughened die face 12a with chromium to improve its durability. Plating with chromium can impart hardness and corrosion resistance to the die face 12a.

(Transparent Conductive Layer)

Next, the transparent conductive layer 4 will be explained.

The transparent conductive layer 4 is a deposited film formed by depositing or sputtering a conductive metal or metal oxide.

To form the transparent conductive layer 4 as a deposited film, indium tin oxide (ITO), antimony-doped tin oxide (ATO), fluorine-doped tin oxide (FTO), aluminum-doped zinc oxide (AZO), or a double oxide consisting of indium oxide and zinc oxide, for example, may be used. It is preferable to form, as the transparent conductive layer, a thin film having a thickness of approximately 40 to 100 nm by vacuum deposition, sputtering or the like, using any of the above-described materials.

(Other Layers)

To use the transparent conductive film 1 according to this embodiment by placing it on the observational side of a display, it is preferable to form an anti-reflection layer on the outermost surface of the transparent conductive film 1 to protect reflection of light. Known anti-reflection layers are of single-layer type and multi-layer type. A common anti-reflection layer of multi-layer type is an anti-reflection layer consisting of high-refractive-index layers and low-refractive-index layers that are alternately laminated. The anti-reflection layer can be formed by vacuum deposition, sputtering or the like, where ITO, titanium dioxide, $ZrO_2$, etc. may be used to form high-refractive-index layers, while $SiO_2$, $MgF_2$, fluororesins, silicone resins, etc. may be used to form low-refractive-index layers.

The transparent conductive film 1 according to this embodiment may be subjected to antistatic treatment so that dusts will not stick to the transparent conductive film 1 during use. Furthermore, the surface of the transparent conductive film 1 on which the fine irregularities are not provided may be subjected to stickiness-imparting treatment by taking convenience upon use into consideration.

Specifically, the antistatic treatment can be carried out by the use of an antistatic agent or antistatic fine particles, which may be added to a coating composition for forming the fine irregularity layer 3 or the transparent hard coat layer 5. Alternatively, the antistatic treatment may be conducted by coating the fine irregularity layer 3 with an antistatic agent itself.

The stickiness-imparting treatment may be conducted by directly applying a polyacrylate or rubber-type pressure-sensitive adhesive. Alternatively, the stickiness-imparting treatment may also be conducted by laminating release paper coated with a pressure-sensitive adhesive. In this case, in order not to bare the pressure-sensitive adhesive layer to prevent the pressure-sensitive adhesive layer from sticking to other objects or protect the pressure-sensitive adhesive layer from dusts, it is better not to peel off the release paper stuck to the transparent conductive film through the pressure-sensitive adhesive layer until the pressure-sensitive adhesive layer is used. It is preferable that the thickness of the pressure-sensitive adhesive layer be from approximately 20 to 40 $\mu$m.

The transparent conductive film 1 according to this embodiment may be provided with a transparent hard coat layer 5 as mentioned previously. The same material as that used to form the aforementioned fine irregularity layer 3 may be used to form the transparent hard coat layer 5. The transparent hard coat layer 5 can be formed by applying such a material by a proper coating method and curing the material by the application of ionizing radiation such as ultraviolet light or an electron beam. The surface of the transparent conductive film 1 on which the transparent hard coat layer 5 is formed can show improved physical and chemical properties. In the case where the transparent conductive layer 4 is laminated to the fine irregularity layer 3 formed on the surface of the transparent plastic film 2, the properties (especially, the physical strength) of the surface of the transparent conductive layer 4 are determined by the underlying fine irregularity layer 3.

(Touch Panel)

The transparent conductive films 1 according to this embodiment can be used as electrode sheets for display panels of various modes, or for touch panels to be placed on the surfaces of displays.

Figure 6:
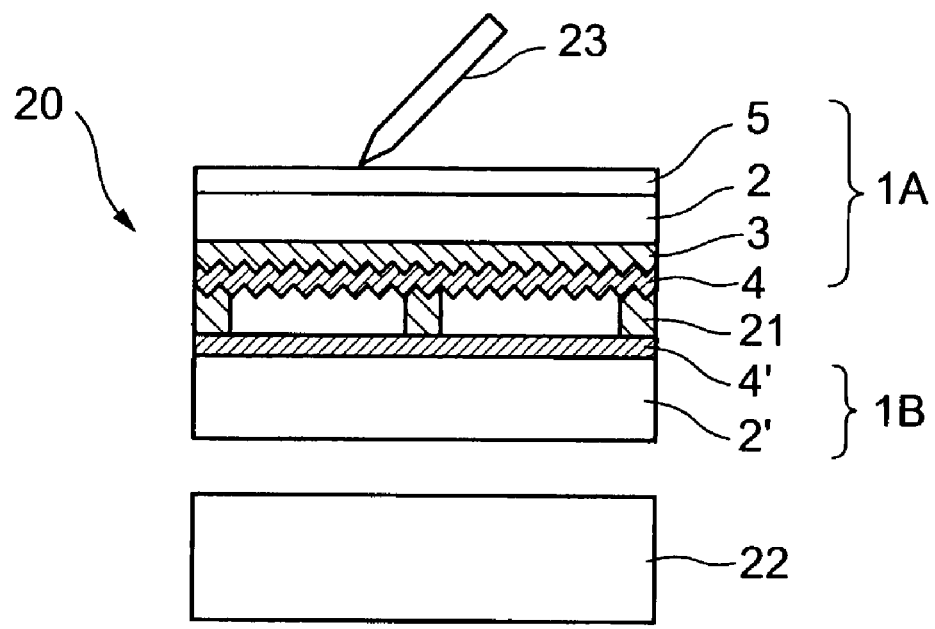
FIG. 6 is a diagrammatic cross-sectional view showing a touch panel including a transparent conductive film according to an embodiment of the present invention.

FIG. 6 is a view showing an example of the application of the transparent conductive film 1 according to this embodiment, to a touch panel. As shown in this figure, a touch panel 20 is composed of a pair of electrode sheets 1A and 1B arranged with a spacer 21 interposed between them so that transparent conductive layers 4 and 4' serving as electrode layers, contained in the electrode sheets 1A and 1B, respectively, can face each other with an extremely small gap between them.

The electrode sheet 1A arranged on the observational side has the same construction as that of the transparent conductive film 1 shown in FIG. 2, and contains a transparent hard coat layer 5, a transparent plastic film 2, a fine irregularity layer 3 and a transparent conductive layer 4 in the order stated, the transparent hard coat layer 5 being the top-most layer on the observational side. On the other hand, the electrode sheet 1B arranged on the back side is composed of a transparent plastic film 2' and a transparent conductive layer 4' laminated thereto, the transparent conductive layer 4' being on the upper, observational side.

As shown in FIG. 6, the touch panel 20 having the above-described construction is placed on top of a display 22. When the surface of the touch panel 20 is pressed by a pen 23 or the like following the instructions displayed on the display 22, the transparent conductive layers 4 and 4' serving as electrode layers, separated by the spacer 21, are electrically connected at the pressed point, and a predetermined signal is generated.

The transparent conductive films for use as the electrode sheets 1A and 1B are not limited to those ones shown in FIG. 6; and transparent conductive films having various structures as shown in FIGS. 1A, 1B and 2 can also be used. Further, it is preferable to use a thicker plate-shaped material as the transparent plastic film 2' in the electrode sheet 1B arranged on the back side so that the electrode sheet 1B can withstand the pressure applied by a pen or the like.

(Electroluminescent Display Panel)

Figure 7:
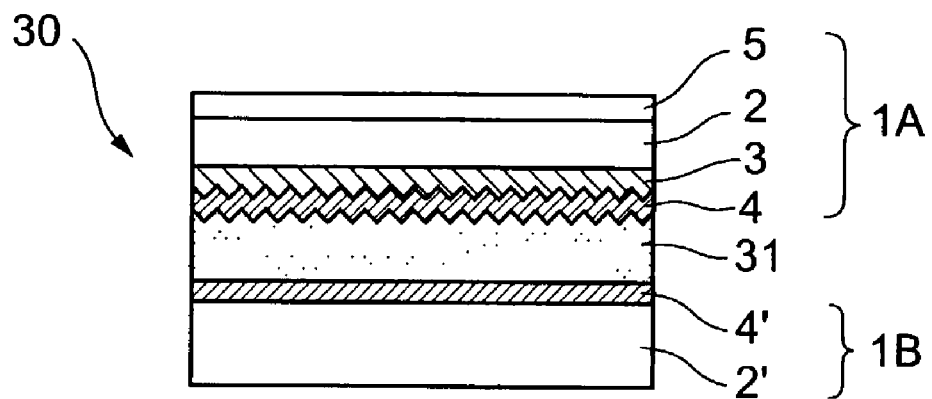
FIG. 7 is a diagrammatic cross-sectional view showing an electroluminescent display panel including a transparent conductive film according to an embodiment of the present invention.

FIG. 7 is a view showing an example of the application of the transparent conductive film 1 according to this embodiment, to an electroluminescent display panel 30. As shown in this figure, the electroluminescent display panel 30 is composed of a pair of electrode sheets 1A and 1B arranged so that transparent conductive layers 4 and 4' serving as electrode layers, contained in the electrode sheets 1A and 1B, respectively, can face each other; and an electroluminescent layer 31 whose both surfaces are covered with insulating layers (not shown in the figure), interposed between the electrode sheets 1A and 1B.

The electrode sheet 1A arranged on the observational side has the same construction as that of the transparent conductive film 1 shown in FIG. 2, and contains a transparent hard coat layer 5, a transparent plastic film 2, a fine irregularity layer 3 and a transparent conductive layer 4 in the order stated, the transparent hard coat layer 5 being the top-most layer on the observational side. On the other hand, the electrode sheet 1B arranged on the back side is composed of a transparent plastic film 2' and a transparent conductive layer 4' laminated thereto, the transparent conductive layer 4' being on the upper, observational side.

The transparent conductive films that are used as the electrode sheets 1A and 1B are not limited to those ones shown in FIG. 7; and transparent conductive films having various structures as shown in FIGS. 1A, 1B and 2 can also be used. It is preferable that the transparent plastic film 2 in the electrode sheet 1A arranged on the front side be as thin as possible to ensure good visibility, while it is preferable to use a thicker plate-shaped material as the transparent plastic film 2' in the electrode sheet 1B arranged on the back side in order to enhance the rigidity of the electroluminescent display panel 30. In the case where the electroluminescent display panel 30 tends to be affected by water, oxygen, etc. contained in the air, it is preferable to air tightly cover the whole electroluminescent display panel 30 with a transparent, moisture resistant sheet.

EXAMPLES

Example 1

200-mesh glass beads (particle diameter: approximately 130 μm) were blown over an iron-made roller by beads shot blasting to form fine irregularities on the surface of the roller. The roller provided with fine irregularities was then plated with chromium so that the thickness of the chromium layer would be 5 μm, thereby obtaining an embossing roller.

On the other hand, a 188-μm thick polyethylene terephthalate resin film was prepared as the transparent plastic film. A composition consisting of a polyurethane resin primer (manufactured by The Inctec Inc., Japan), and a 10:1:3.3 (weight ratio) mixture of a medium main agent for chemical mat varnish, a curing agent (XEL curing agent) and a solvent was applied to one surface of the transparent plastic film by gravure coating, and was then dried to form a 3-μm thick primer layer. The solvent used was a 1:1 solvent mixture of toluene and methyl ethyl ketone. It is noted that all blend ratios that appear in the descriptions of Examples 1 & 2 and Comparative Examples 1 & 2 are based on mass.

The embossing machine 10 shown in FIG. 5 was used, where an ultraviolet-light-curing resin (trade mark "Unidic RC20-941", manufactured by Dainippon Ink & Chemical, Inc., Japan) was applied to the embossing roller, and the polyethylene terephthalate resin film coated with the primer layer was laminated to the embossing roller with the primer layer faced the application side. Subsequently, ultraviolet light was applied from the film side by using an ultraviolet light source (D bulb manufactured by Fusion UV Systems, Inc.); and the polyethylene terephthalate resin film was then separated from the embossing roller, thereby obtaining a polyethylene terephthalate resin film to which a cured transparent resin layer made from the ultraviolet-light-curing resin, having fine irregularities on its surface, had been laminated.

Thereafter, by using a direct current magnetron sputtering apparatus and, as a target, sintered ITO, a 25-μm thick ITO thin film was deposited on the transparent resin layer provided with fine irregularities, under the following conditions: the film temperature=100° C., the degree of vacuum=$2\times10^{-3}$ Torr, the making power=1 kW, and the deposition time=4 seconds. Thus, a transparent conductive film was finally obtained.

Example 2

The procedure of Example 1 was repeated to obtain a transparent conductive film, provided that a 100:75 (weight ratio) mixture of an ultraviolet-light-curing acrylic resin (trademark "PET-D31", manufactured by Dainichiseika Color & Chemicals Mfg. Co., Ltd., Japan) and a solvent was applied by roll coating (twin reverse rolls) to the surface of the polyethylene terephthalate resin film to which the transparent resin layer having fine irregularities and the ITO thin film had not been laminated, was dried, and was then cured by the application of ultraviolet light to form a hard coat layer having a mirror surface. The solvent used was a 3:1 mixture of toluene and methyl ethyl ketone.

Comparative Example 1

The procedure of Example 2 was repeated, provided that the lamination of the transparent resin layer having fine irregularities was omitted, thereby obtaining a transparent conductive film having a hard coat layer.

Comparative Example 2

The procedure of Example 2 was repeated, provided that the lamination of the transparent resin layer having fine irregularities was conducted by the use of the following mat coating composition under the processing conditions described below, thereby obtaining a transparent conductive film having a hard coat layer.

<Mat Coating Composition>
Ultraviolet-light-curing acrylic resin: 100 parts
Silica beads (mean particle diameter: 1.0 μm): 7.5 parts
  Silicone oil: 0.1 parts <Processing Conditions>
The above-described mat coating composition was applied to the surface of the polyethylene terephthalate resin film by gravure reverse roll coating so that the amount of the coating composition applied would be 1.5–2 g/m². This coating composition applied was then cured by the application of ultraviolet light (90 mJ×3 times) in an atmosphere of nitrogen, thereby laminating, to the polyethylene terephthalate resin film, the transparent resin layer having on its surface fine irregularities produced by the silica beads.

(Results of Evaluation)

The transparent conductive films of Examples 1 and 2 and Comparative Examples 1 and 2 were evaluated in terms of total light transmittance (%), haze value, surface roughness (ten-point mean roughness (Rz) and maximum height (Rmax)), distinctness of image, anti-glaring properties, pencil hardness, slipperiness at ITO film deposition, and sharpness of image when visually observed. The evaluation methods employed are as follows.

The total light transmittance (%) and haze value were measured by a haze meter ("Direct-Reading Haze Meter" manufactured by Toyo Seiki Co., Ltd., Japan).

The surface roughness (ten-point mean roughness (Rz) and maximum height (Rmax)) was determined by using a surface roughness tester ("Surfcoder SE-30K" manufactured by Kosaka Laboratory, Ltd., Japan).

The distinctness of image was evaluated by a specified measuring method (Method for Measuring the Distinctness of Image according to JIS K7105, 6.6), where the total value of the measured values obtained by using four different optical combs (optical comb width: 0.25 mm, 0.5 mm, 1 mm and 2 mm) was taken as the distinctness of image. When this value obtained is higher, the distinctness of image is better. An image clarity tester ("ICP-IPD" manufactured by Suga Test Instrument Co., Ltd., Japan) was used for the measurement.

The anti-glaring property was evaluated by adhering the transparent conductive film to the front surface of a color filter for a liquid crystal display (LCD), photographing the surface of the transparent conductive film by using an image clarity measuring device ("MJ-RTS" manufactured by Mizojiri Optical Co., Ltd., Japan), and obtaining the standard deviation of the brightness on the screen. The value of this standard deviation obtained was taken as a measure of the anti-glaring property. When this value is smaller, the degree of glaring is lower.

The pencil hardness test was conducted by the use of a pencil hardness tester ("EP-001" manufactured by Rigaku Kogyosha, Japan).

The slipperiness at ITO film deposition was evaluated by observing the transparent plastic film when it was unrolled before conducting vacuum deposition or sputtering, as to whether the following troubles were raised or not: (1) the transparent plastic film was damaged when brought into contact with the rollers in the apparatus used; (2) the transparent plastic film meandered during running or winding and, as a result, the rolled transparent plastic film had an irregular edge face; and (3) the tension on the transparent plastic film could not be kept constant. "No good" in Table 1 means that the transparent plastic film was suffered from at least one of these troubles; and "good" means that the transparent plastic film was not suffered from these troubles at all.

The sharpness of image was evaluated by placing the transparent conductive film on the front surface of a liquid crystal display (LCD) with a 0.7-mm thick transparent glass plate interposed between them. In Table 1, the transparent conductive film that made the image on the liquid crystal display fuzzy was indicated by "no good"; and the transparent conductive film that did not make the image on the liquid crystal display fuzzy was indicated by "good".

TABLE 1

|  | Ex. 1 | Ex. 2 | Comp. Ex. 1 | Comp. Ex. 2 |
|---|---|---|---|---|
| Total light transmittance (%) | 90.0 | 89.7 | 90.7 | 87.4 |
| Haze value | 5.9 | 6.1 | 1.2 | 8.1 |
| Rz (μm) | 0.37 | 0.37 | 0.34 | 1.01 |
| Rmax (μm) | 0.81 | 0.81 | 0.48 | 2.20 |
| Distinctness of image | 420 | 390 | 500 | 150 |
| Anti-glaring property | 12 | 12 | 11 | 27 |
| Pencil hardness | 2H | 2H | 2H | 2H |
| Slipperiness at ITO film deposition | good | good | no good | good |
| Sharpness of image when visually observed | good | good | good | no good |

What is claimed is:

1. A transparent conductive film comprising:
   a transparent plastic film; and
   a transparent conductive layer laminated to a surface of the transparent plastic film;
   wherein:
   the transparent conductive film has a haze value of 8 or less;
   the transparent plastic film includes a first surface to which the transparent conductive layer is laminated and a second surface opposite from the first surface;
   at least one of the first surface and the second surface is provided with fine irregularities having a maximum height (Rmax) of 0.5 to 2.0 μm and
   the fine irregularities include a first quantity of protrusions per unit of area and a second quantity of depressions per unit of area and the first quantity is greater than the second quantity.

2. The transparent conductive film according to claim 1, wherein the fine irregularities have a ten-point mean roughness (Rz) of 0.35 to 1.5 μm.

3. The transparent conductive film according to claim 1, wherein:
   the transparent plastic film comprises a transparent plastic substrate; and
   the fine irregularities are provided on a surface of the transparent plastic substrate.

4. The transparent conductive film according to claim 1, wherein:
   the transparent plastic film comprises a transparent plastic substrate and a transparent resin layer formed on a surface of the transparent plastic substrate; and
   the fine irregularities are provided on a surface of the transparent resin layer.

5. The transparent conductive film according to claim 1, further comprising a hard coat layer laminated to the second surface of the transparent plastic film.

6. The transparent conductive film according to claim 5, wherein:
the fine irregularities are provided on the first surface of the transparent plastic film; and
the second surface of the transparent plastic film is sufficiently smooth so that an exposed surface of the hard coat layer can be a mirror surface.

7. A touch panel comprising:
a first sheet having a first electrode layers; and
a second sheet having a second electrode layer, the second sheet being arranged on the first sheet with a spacer interposed between the first and second sheets so that the first electrode layer and the second electrode layer face each other with a gap between the layers;
wherein:
at least one of the first sheet and the second sheet is a transparent conductive film comprising a transparent plastic film and a transparent conductive layer;
the transparent conductive layer serves as a respective one of the electrode layers;
the transparent conductive layer is laminated to a surface of the transparent plastic film;
the transparent conductive film has a haze value of 8 or less;
the transparent plastic film includes a first surface to which the transparent conductive layer is laminated and a second surface opposite from the first surface, at least one of the first surface and the second surface being provided with fine irregularities having a maximum height (Rmax) of 0.5 to 2.0 $\mu$m; and
the fine irregularities include a first quantity of protrusions per unit of area and a second quantity of depressions per unit of area and the first quantity is greater than the second quantity.

8. The touch panel according to claim 7, wherein the fine irregularities on the transparent conductive film have a ten-point mean roughness (Rz) of 0.35 to 1.5 $\mu$m.

9. An electroluminescent display panel comprising:
a first sheet having a first electrode layer; and
a second sheet having a second electrode layer, the second sheet being arranged on the first sheet with a luminescent layer interposed between the first sheet and the second sheet so that the first electrode layer and the second electrode layer face each other with the luminescent layer between the layers;
wherein:
at least one of the first sheet and the second sheet is a transparent conductive film comprising a transparent plastic film and a transparent conductive layer;
the transparent conductive layer serves as a respective one of the electrode layers;
the transparent conductive layer is laminated to a surface of the transparent plastic film;
the transparent conductive film has a haze value of 8 or less;
the transparent plastic film includes a first surface to which the transparent conductive layer is laminated and a second surface opposite from the first surface, at least one of the first surface and the second surface being provided with fine irregularities having a maximum height (Rmax) of 0.5 to 2.0 $\mu$m; and
the fine irregularities include a first quantity of protrusions per unit of area and a second quantity of depressions per unit of area and the first quantity is greater than the second quantity.

10. The electroluminescent display panel according to claim 9, wherein the fine irregularities on the transparent conductive film have a ten-point mean roughness (Rz) of 0.35 to 1.5 $\mu$m.

* * * * *